Feb. 20, 1968     K. TOLLE     3,369,853
REVERSED TELEPHOTO OBJECTIVE IN WHICH THE FRONT DIVERGENT
MEMBER HAS THREE SPACED COMPONENTS
Filed July 1, 1964
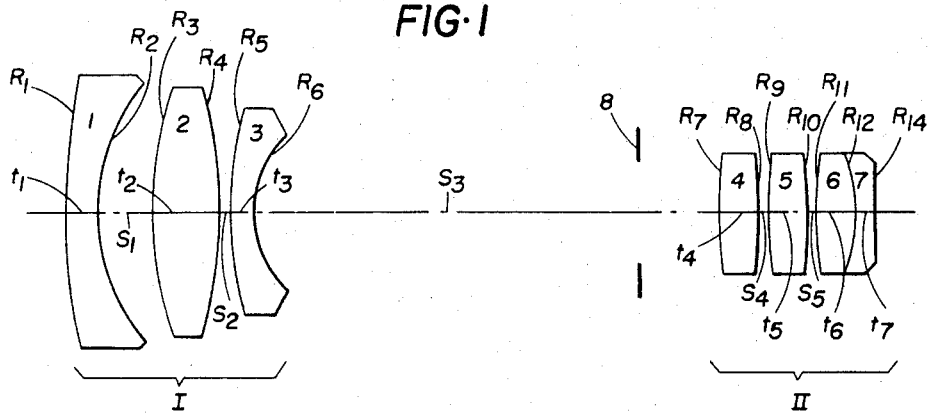
FIG·1
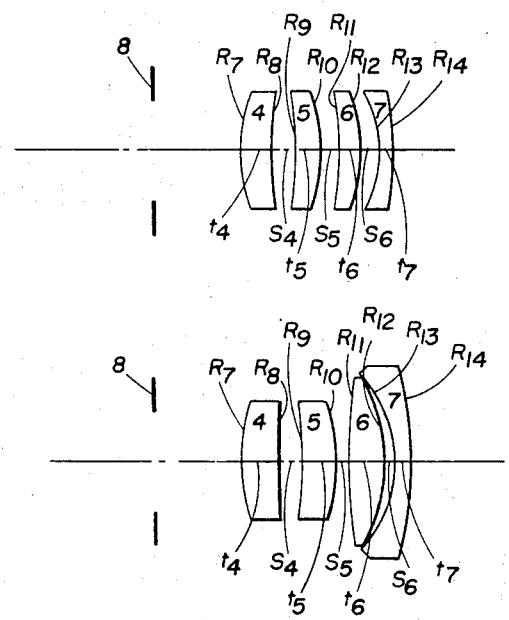
FIG·2
FIG·3
KARL TOLLE
INVENTOR.
BY
ATTORNEYS 3,369,853
REVERSED TELEPHOTO OBJECTIVE IN WHICH THE FRONT DIVERGENT MEMBER HAS THREE SPACED COMPONENTS
Karl Tolle, Rochester, N.Y., assignor to Eastman Kodak Company, Rochester, N.Y., a corporation of New Jersey
Filed July 1, 1964, Ser. No. 379,449
7 Claims. (Cl. 350—214)

ABSTRACT OF THE DISCLOSURE

A photographic objective of the reversed telephoto type is disclosed consisting of a front divergent member adapted for use with one of a plurality of rear convergent members. The front divergent member comprises in spaced alignment a front negative meniscus element concave to the rear, a middle positive element and a rear negative meniscus element concave to the rear. The rear convergent members each comprise three positive elements in spaced alignment and a negative meniscus element concave to the front, the negative element being positioned in alignment with and to the rear of the three positive elements of the rear member. The two rearmost elements of the rear member may be in surface contact or separated by an air space.

---

This invention relates to reversed telephoto objectives which are sufficiently well corrected to be used in document copying. More particularly this invention relates to reversed telephoto objectives of the type which have a front divergent member having three spaced components, the first being a negative menscus component, the second a positive component and the third another negative meniscus component, the meniscus components both being concave to the rear.

Reversed telephoto objectives with the above mentioned type of front member have been designed with field coverage out to about 40° half angle. Correction of aberrations in these systems, although good enough for most wide angle uses, is not of the very high quality necessary for document copying where extremely high definition and flatness of field is necessary even at the corners of the document.

According to the present invention, if the field is reduced to less than 35° half angle, certain distinctive features mentioned below can be employed to give the extremely high corrections necessary. Compared to the above mentioned prior art, if more power is placed in the rear surface of the third element from the front, the field can be made more backward curving and the astigmatism more overcorrected. Similarly, if the first two elements are given more power by either adjusting the appropriate radii or by a new choice of refractive material, slight overcorrections of the important off-axis aberrations of coma, oblique spherical aberration and zonal astigmatism can be obtained. These slight overcorrections and backward curving field are quite favorable for best overall corrections throughout the field coverage of the lens.

Also according to this invention, it was found that a number of somewhat different rear members could be designed for the same front member which would give different magnifications for the same or nearly the same object-to-image distance while maintaining the very high corrections mentioned above.

Therefore, it is an object of this invention to provide a reversed telephoto objective having the freedom from aberration including flatness of field necessary for document recording work of high quality.

It is another object of this invention to provide a front member of a reversed telephoto objective which may be used with various rear members to vary magnification while maintaining the same object-to-image distance.

The terms front and rear herein shall refer to the end of the objective nearest the long and short conjugates of the system respectively. All numberings are from front to rear.

In the accompanying drawings:

FIG. 1 is a diagrammatic axial section of an objective according to the invention.

FIGS. 2 and 3 are diagrammatic axial sections of alternate embodiments of the rear member of the objective shown in FIG. 1.

In FIG. 1 the objective is made up of two members, a front member I and a rear member II. The front member is made up of elements 1, 2 and 3; 1 and 3 being negative meniscus and element 2 being positive.

FIGS. 1, 2 and 3 show three types of different rear members which may be used with the front member of FIG. 1. These rear members are similar to that shown in U.S. Patent 2,548,569, Tolle. They all contain three positive components, the first two being single elements, elements 4 and 5, while the third component is made up of two elements, 6 and 7, 6 being positive and 7 negative. In FIG. 1 elements 6 and 7 are cemented together, while in FIGS. 2 and 3 there is an airspace, $S_6$, between them. As shown in the drawings, each of the rear elements may be meniscus or not as the situation warrants for correction at different magnifications. A stop 8 is placed preferably between members I and II. The radii $R_1$ to $R_{14}$, thicknesses $t_1$ to $t_7$, and spacings $S_1$ to $S_7$ are numbered from front to rear. $R_{13}$ is used only as the designation for the front surface of element 7 when it is airspaced from element 6.

As stated above, the front member, composed of two negative meniscus elements, separated by a positive element, will be capable of much higher corrections if certain restrictions are followed as to the power of the rear surface of element 3, and the power of the first two elements. More specifically, if the absolute value of the radius of curvature of $R_6$ is always kept less than $.4F_1$, where $F_1$ is the absolute value of the focal length of the front member, a flat field can be obtained out to more than 24° half angle together with excellent astigmatism correction. The term "absolute value" as used herein shall refer to the value of a number without regard to its sign.

Similarly, it was found that if the first two components are individually made strong and close together excellent corrections can be obtained, largely eliminating certain off-axis aberrations especially coma and oblique spherical. More specifically, the absolute value of the ratio of the focal length of the first component (the front negative meniscus component) to $F_1$ should be less than 2.5 to 1 and preferably less than 1.75 to 1. The absolute value of the focal length of the second component (the positive component) should be between $.5F_1$ and $1.5F_1$ and preferably between $.9F_1$ and $1.3F_1$ and the axial distance $S_1$ plus $t_2$ plus $S_2$ should be less than $.5F$ and preferably less than $.4F$.

The above alterations in the usual design of this type of front member are best shown in the following examples in which the absolute value of the focal length, $F_1$, of the front member (elements 1, 2 and 3) is 100 mm. The lens elements in the first column are numbered from front to rear from 1 to 7 as shown in the drawing; the refractive indexes N for the D line of the spectrum and the dispersive indexes V for the glasses are shown in the next two columns, respectively; the radii of curvature R of the lens surfaces are given in the fourth column and the thicknesses $t$ of the lens elements and the separations S between lens elements are shown in the last column.

EXAMPLE 1

| Lens Element | N | V | Radius, mm. | Thickness or Separation, mm. |
|---|---|---|---|---|
| 1 | 1.572 | 57.4 | $R_1 = +506.3$ | $t_1 = 8.31$ |
|   |       |      | $R_2 = +68.3$  | $S_1 = 13.61$ |
| 2 | 1.745 | 46.4 | $R_3 = +134.7$ | $t_2 = 20.17$ |
|   |       |      | $R_4 = -172.0$ | $S_2 = 1.36$ |
| 3 | 1.572 | 57.4 | $R_5 = +142.3$ | $t_3 = 6.24$ |
|   |       |      | $R_6 = +33.9$  | $S_3 = 122.0$ |
| 4 | 1.517 | 64.5 | $R_7 = +105.8$ | $t_4 = 13.19$ |
|   |       |      | $R_8 = -205.7$ | $S_4 = 1.63$ |
| 5 | 1.517 | 64.5 | $R_9 = +105.3$ | $t_5 = 13.78$ |
|   |       |      | $R_{10} = -105.3$ | $S_5 = 1.66$ |
| 6 | 1.511 | 63.5 | $R_{11} = +81.8$ | $t_6 = 13.90$ |
|   |       |      | $R_{12} = -46.5$ | $t_7 = 4.23$ |
| 7 | 1.751 | 27.8 | $R_{14} = +382.5$ | |

For Example 1, the focal length of the whole system is $+34.02$ mm., the back focus is $+54.36$ mm. and the magnification is 38.

As mentioned above, the front member can be used with a series of rear members as shown in Examples 2–4 in which the front member is the same as Example 1.

EXAMPLE 2

| Lens Element | N | V | Radius, mm. | Thickness or Separation, mm. |
|---|---|---|---|---|
|   |       |      |                 | $S_3 = 111.6$ |
| 4 | 1.517 | 64.5 | $R_7 = +186.1$  | $t_4 = 15.50$ |
|   |       |      | $R_8 = -113.6$  | $S_4 = 1.89$  |
| 5 | 1.517 | 64.5 | $R_9 = +224.0$  | $t_5 = 15.62$ |
|   |       |      | $R_{10} = -103.8$ | $S_5 = 1.89$ |
| 6 | 1.511 | 63.5 | $R_{11} = +96.2$ | $t_6 = 16.33$ |
| 7 | 1.751 | 27.8 | $R_{12} = -54.5$ | $t_7 = 4.97$ |
|   |       |      | $R_{14} = +748.3$ | |

For Example 2, the focal length of the whole objective is $+42.47$, the back focus is 69.30 and the magnification is 30.

EXAMPLE 3

| Lens Element | N | V | Radius, mm. | Thickness or Separation, mm. |
|---|---|---|---|---|
|   |       |      |                   | $S_3 = 100.06$ |
| 4 | 1.588 | 61.2 | $R_7 = +68.2$     | $t_4 = 10.59$ |
|   |       |      | $R_8 = +634.4$    | $S_4 = 5.74$  |
| 5 | 1.500 | 61.6 | $R_9 = -266.0$    | $t_5 = 10.03$ |
|   |       |      | $R_{10} = -62.72$ | $S_5 = 2.96$  |
| 6 | 1.588 | 61.2 | $R_{11} = +385.1$ | $t_6 = 10.88$ |
|   |       |      | $R_{12} = -46.8$  | $S_6 = 2.25$  |
| 7 | 1.620 | 29.3 | $R_{13} = -37.0$  | $t_7 = 4.14$  |
|   |       |      | $R_{14} = -163.0$ | |

For Example 3, the focal length of the whole objective is 56.02, the back focus is 92.40 and the magnification is 22.5.

EXAMPLE 4

| Lens Element | N | V | Radius, mm. | Thickness or Separation, mm. |
|---|---|---|---|---|
|   |       |      |                    | $S_3 = 94.65$ |
| 4 | 1.541 | 59.9 | $R_7 = +47.04$     | $t_4 = 7.72$  |
|   |       |      | $R_8 = +150.2$     | $S_4 = 7.54$  |
| 5 | 1.541 | 59.9 | $R_9 = -137.6$     | $t_5 = 7.72$  |
|   |       |      | $R_{10} = -57.23$  | $S_5 = 2.45$  |
| 6 | 1.588 | 61.2 | $R_{11} = -1154.8$ | $t_6 = 8.10$  |
|   |       |      | $R_{12} = -41.57$  | $S_6 = 3.52$  |
| 7 | 1.689 | 30.9 | $R_{13} = -30.30$  | $t_7 = 3.70$  |
|   |       |      | $R_{14} = -97.81$  | |

For Example 4, the focal length of the whole objective is $+65.72$ mm., the back focus is 107.4 mm. and the magnification is 19.

The rear members in these four examples can be interchanged on the same document copier with an appropriate choice of central airspace and lens position. This allows printing different sized originals or different parts of originals to the same size with merely the interchange of the rear members. Since the front member is much more expensive than the rear member, there is a considerable cost saving.

Examples 5 and 6 are further examples of highly corrected objectives using the characteristics of applicant's invention mentioned above.

EXAMPLE 5

| Lens Element | N | V | Radius, mm. | Thickness or Separation, mm. |
|---|---|---|---|---|
| 1 | 1.569 | 57.4 | $R_1 = +509.5$ | $t_1 = 8.33$ |
|   |       |      | $R_2 = +77.9$  | $S_1 = 13.71$ |
| 2 | 1.740 | 46.4 | $R_3 = +134.4$ | $t_2 = 20.95$ |
|   |       |      | $R_4 = -252.1$ | $S_2 = 1.43$  |
| 3 | 1.569 | 57.4 | $R_5 = +138.1$ | $t_3 = 5.95$  |
|   |       |      | $R_6 = +34.4$  | $S_3 = 125.9$ |
| 4 | 1.515 | 64.5 | $R_7 = +108.0$ | $t_4 = 13.29$ |
|   |       |      | $R_8 = -198.5$ | $S_4 = 1.67$  |
| 5 | 1.515 | 64.5 | $R_9 = +97.2$  | $t_5 = 13.86$ |
|   |       |      | $R_{10} = -117.0$ | $S_5 = 1.67$ |
| 6 | 1.509 | 63.5 | $R_{11} = +82.4$  | $t_6 = 14.00$ |
|   |       |      | $R_{12} = -48.2$  | |
| 7 | 1.743 | 27.8 | $R_{14} = +307.0$ | $t_7 = 4.29$ |

In Example 5, the focal length of the whole objective is +34.43 and the back focus is +55.10. Its field coverage is 32° half angle, the widest of all the examples.

EXAMPLE 6

| Lens Element | N | V | Radius, mm. | Thickness or Separation, mm. |
|---|---|---|---|---|
| 1 | 1.572 | 57.4 | $R_1 = +521.8$ | $t_1 = 8.59$ |
|   |       |      | $R_2 = +79.8$  | $S_1 = 14.02$ |
| 2 | 1.745 | 46.4 | $R_3 = +137.8$ | $t_2 = 21.46$ |
|   |       |      | $R_4 = -258.5$ | $S_2 = 1.44$ |
| 3 | 1.572 | 57.4 | $R_5 = +134.0$ | $t_3 = 6.11$ |
|   |       |      | $R_6 = +34.5$  | $S_3 = 125.1$ |
| 4 | 1.517 | 64.5 | $R_7 = +102.0$ | $t_4 = 10.87$ |
|   |       |      | $R_8 = -239.2$ | $S_4 = 1.70$ |
| 5 | 1.517 | 64.5 | $R_9 = +102.0$ | $t_5 = 14.20$ |
|   |       |      | $R_{10} = -116.3$ | $S_5 = 1.70$ |
| 6 | 1.511 | 63.5 | $R_{11} = +84.3$ | $t_6 = 14.68$ |
|   |       |      | $R_{12} = -49.2$ |              |
| 7 | 1.751 | 27.7 | $R_{14} = +322.0$ | $t_7 = 2.88$ |

In Example 6, the focal length of the whole objective is +35.73 and the back focus is +57.39.

The invention has been described in considerable detail with particular reference to certain preferred embodiments thereof but it will be understood that certain variations and modifications can be effected within the spirit and scope of the invention as described hereinbefore and as defined in the appended claims.

I claim:

1. A photographic objective of the reversed telephoto type consisting of a front divergent member and a rear convergent member, the front divergent member of which has characteristics according to the following table:

| Lens Element | N | V | Radius, mm. | Thickness or Separation, mm. |
|---|---|---|---|---|
| 1 | 1.57 | 57.4 | $R_1 = +506$ | $t_1 = 8.31$ |
|   |      |      | $R_2 = +68.3$ | $S_1 = 13.6$ |
| 2 | 1.74 | 46.4 | $R_3 = +135$ | $t_2 = 20.2$ |
|   |      |      | $R_4 = -172$ | $S_2 = 1.36$ |
| 3 | 1.57 | 57.4 | $R_5 = +142$ | $t_3 = 6.24$ |
|   |      |      | $R_6 = +33.9$ |            | wherein the lens elements are numbered from front to rear, N is the index of refraction for the sodium D line of the spectrum, V is the dispersive index, and $R_1$–$R_6$, $t_1$–$t_3$ and $S_1$–$S_2$ are the radii, thicknesses and separations respectively numbered from front to rear in millimeters said rear convergent member comprising three positive elements in spaced alignment and a negative meniscus element, concave to the front and positioned in alignment with and rearwardly of said three positive elements of said rear member.

2. A photographic objective of the reversed telephoto type which has characteristics according to the following table:

| Lens Element | N | V | Radius, mm. | Thickness or Separation, mm. |
|---|---|---|---|---|
| 1 | 1.57 | 57.4 | $R_1 = +509$ | $t_1 = 8.33$ |
|   |      |      | $R_2 = +77.9$ | $S_1 = 13.7$ |
| 2 | 1.74 | 46.4 | $R_3 = +134$ | $t_2 = 20.9$ |
|   |      |      | $R_4 = -252$ | $S_2 = 1.43$ |
| 3 | 1.57 | 57.4 | $R_5 = +138$ | $t_3 = 5.95$ |
|   |      |      | $R_6 = +34.4$ | $S_3 = 126$ |
| 4 | 1.51 | 64.5 | $R_7 = +108$ | $t_4 = 13.3$ |
|   |      |      | $R_8 = -198$ | $S_4 = 1.67$ |
| 5 | 1.51 | 64.5 | $R_9 = +97.2$ | $t_5 = 13.9$ |
|   |      |      | $R_{10} = -117$ | $S_5 = 1.67$ |
| 6 | 1.51 | 63.5 | $R_{11} = +82.4$ | $t_6 = 14$ |
|   |      |      | $R_{12} = -48.2$ |           |
| 7 | 1.74 | 27.8 | $R_{14} = +307$ | $t_7 = 4.29$ | wherein the lens elements are numbered from front to rear, N is the index of refraction for the sodium D line of the spectrum, V is the dispersive index, and $R_1$–$R_{14}$, $t_1$–$t_7$ and $S_1$–$S_5$ are the radii, thicknesses and separations respectively numbered from front to rear in millimeters.

3. A photographic objective of the reversed telephoto type which has charatceristics according to the following table:

| Lens Element | N | V | Radius, mm. | Thickness or Separation, mm. |
|---|---|---|---|---|
| 1 | 1.57 | 57.4 | $R_1 = +521$ | $t_1 = 8.59$ |
|   |      |      | $R_2 = +79.8$ | $S_1 = 14$ |
| 2 | 1.74 | 46.4 | $R_3 = +137$ | $t_2 = 21.4$ |
|   |      |      | $R_4 = -258$ | $S_2 = 1.44$ |
| 3 | 1.57 | 57.4 | $R_5 = +134$ | $t_3 = 6.11$ |
|   |      |      | $R_6 = +34.5$ | $S_3 = 125.1$ |
| 4 | 1.52 | 64.5 | $R_7 = +102$ | $t_4 = 10.9$ |
|   |      |      | $R_8 = -239$ | $S_4 = 1.70$ |
| 5 | 1.52 | 64.5 | $R_9 = +102$ | $t_5 = 14.2$ |
|   |      |      | $R_{10} = -116$ | $S_5 = 1.70$ |
| 6 | 1.51 | 63.5 | $R_{11} = +84.3$ | $t_6 = 14.7$ |
|   |      |      | $R_{12} = -49.2$ |           |
| 7 | 1.75 | 27.7 | $R_{14} = +322$ | $t_7 = 2.88$ | wherein the lens elements are numbered from front to rear, N is the index of refraction for the sodium D line of the spectrum, V is the dispersive index, and $R_1$–$R_{14}$, $t_1$–$t_7$ and $S_1$–$S_5$ are the radii, thicknesses and separations respectively numbered from front to rear in millimeters.

4. A photographic objective of the reversed telephoto type which has characteristics according to the following table, wherein the lens elements are numbered from front to rear, R, T and S refer respectively in millimeters to the radii of curvature of the lens surfaces, the thicknesses of the lens elements and spacings between the lens elements, numbered by subscript from front to rear, N is the index of refraction for the sodium D line of the spectrum, and V is the index of dispersion:

| Lens Element | N | V | Radius, mm. | Thickness or Separation, mm. |
|---|---|---|---|---|
| 1 | 1.57 | 57.4 | $R_1 = +506$ | $t_1 = 8.31$ |
|   |      |      | $R_2 = +68.3$ | $S_1 = 13.6$ |
| 2 | 1.74 | 46.4 | $R_3 = +135$ | $t_2 = 20.2$ |
|   |      |      | $R_4 = -172$ | $S_2 = 1.36$ |
| 3 | 1.57 | 57.4 | $R_5 = +142$ | $t_3 = 6.24$ |
|   |      |      | $R_6 = +33.9$ | $S_3 = 122$ |
| 4 | 1.52 | 64.5 | $R_7 = +106$ | $t_4 = 13.2$ |
|   |      |      | $R_8 = -206$ | $S_4 = 1.63$ |
| 5 | 1.52 | 64.5 | $R_9 = +105$ | $t_5 = 13.8$ |
|   |      |      | $R_{10} = -105$ | $S_5 = 1.66$ |
| 6 | 1.51 | 63.5 | $R_{11} = +81.8$ | $t_6 = 13.9$ |
| 7 | 1.75 | 27.8 | $R_{12} = -46.5$ | $t_7 = 4.23$ |
|   |      |      | $R_{14} = +382$ |  |

5. A photographic objective of the reversed telephoto type which has characteristics according to the following table, wherein the lens elements are numbered from front to rear, R, T and S refer respectively in millimeters to the radii of curvature of the lens surfaces, the thicknesses of the lens elements and spacings between the lens elements, numbered by subscript from front to rear, N is the index of refraction for sodium D line of the spectrum, and V is the index of dispersion:

| Lens Element | N | V | Radius, mm. | Thickness or Separation, mm. |
|---|---|---|---|---|
| 1 | 1.57 | 57.4 | $R_1 = +506$ | $t_1 = 8.31$ |
|   |      |      | $R_2 = +68.3$ | $S_1 = 13.6$ |
| 2 | 1.74 | 46.4 | $R_3 = +135$ | $t_2 = 20.2$ |
|   |      |      | $R_4 = -172$ | $S_2 = 1.36$ |
| 3 | 1.57 | 57.4 | $R_5 = +142$ | $t_3 = 6.24$ |
|   |      |      | $R_6 = +33.9$ | $S_3 = 112$ |
| 4 | 1.52 | 64.5 | $R_7 = +186$ | $t_4 = 15.5$ |
|   |      |      | $R_8 = -114$ | $S_4 = 1.89$ |
| 5 | 1.52 | 64.5 | $R_9 = +224$ | $t_5 = 15.6$ |
|   |      |      | $R_{10} = -104$ | $S_5 = 1.89$ |
| 6 | 1.51 | 63.5 | $R_{11} = +96.2$ | $t_6 = 16.3$ |
| 7 | 1.75 | 27.8 | $R_{12} = -54.5$ | $t_7 = 4.97$ |
|   |      |      | $R_{14} = +748$ |  |

6. A photographic objective of the reversed telephoto type which has characteristics according to the following table, wherein the lens elements are numbered from front to rear, R, T and S refer respectively in millimeters to the radii of curvature of the lens surfaces, the thicknesses of the lens elements and spacings between the lens elements, numbered by subscript from front to rear, N is the index of refraction for the sodium D line of the spectrum, and V is the index of dispersion:

| Lens Element | N | V | Radius, mm. | Thickness or Separation, mm. |
|---|---|---|---|---|
| 1 | 1.57 | 57.4 | $R_1 = +506$ | $t_1 = 8.31$ |
|   |      |      | $R_2 = +68.3$ | $S_1 = 13.6$ |
| 2 | 1.74 | 46.4 | $R_3 = +135$ | $t_2 = 20.2$ |
|   |      |      | $R_4 = -172$ | $S_2 = 1.36$ |
| 3 | 1.57 | 57.4 | $R_5 = +142$ | $t_3 = 6.24$ |
|   |      |      | $R_6 = +33.9$ | $S_3 = 100$ |
| 4 | 1.59 | 61.2 | $R_7 = +68.2$ | $t_4 = 10$ |
|   |      |      | $R_8 = +634$ | $S_4 = 5.74$ |
| 5 | 1.50 | 61.6 | $R_9 = -266$ | $t_5 = 10$ |
|   |      |      | $R_{10} = -62.7$ | $S_5 = 2.96$ |
| 6 | 1.59 | 61.2 | $R_{11} = +385$ | $t_6 = 10.9$ |
|   |      |      | $R_{12} = -46.8$ | $S_6 = 2.25$ |
| 7 | 1.62 | 29.3 | $R_{13} = -37$ | $t_7 = 4.14$ |
|   |      |      | $R_{14} = -163$ |  |

7. A photographic objective of the reversed telephoto type which has characteristics according to the following table, wherein the lens elements are numbered from front to rear, R, T and S refer respectively in millimeters to the radii of curvature of the lens surfaces, the thicknesses of the lens elements and spacings between the lens elements, numbered by subscript from front to rear, N is the index of refraction for the sodium D line of the spectrum, and V is the index of dispersion:

| Lens Element | N | V | Radius, mm. | Thickness or Separation, mm. |
|---|---|---|---|---|
| 1 | 1.57 | 57.4 | $R_1 = +506$ | $t_1 = 8.31$ |
|   |      |      | $R_2 = +68.3$ | $S_1 = 13.6$ |
| 2 | 1.74 | 46.4 | $R_3 = +135$ | $t_2 = 20.2$ |
|   |      |      | $R_4 = -172$ | $S_2 = 1.36$ |
| 3 | 1.57 | 57.4 | $R_5 = +142$ | $t_3 = 6.24$ |
|   |      |      | $R_6 = +33.9$ | $S_3 = 94.6$ |
| 4 | 1.54 | 59.9 | $R_7 = +47$ | $t_4 = 7.72$ |
|   |      |      | $R_8 = +150$ | $S_4 = 7.54$ |
| 5 | 1.54 | 59.9 | $R_9 = -138$ | $t_5 = 7.72$ |
|   |      |      | $R_{10} = -57.2$ | $S_5 = 2.45$ |
| 6 | 1.59 | 61.2 | $R_{11} = -1150$ | $t_6 = 8.10$ |
|   |      |      | $R_{12} = -41.6$ | $S_6 = 3.52$ |
| 7 | 1.69 | 30.9 | $R_{13} = -30.3$ | $t_7 = 3.70$ |
|   |      |      | $R_{14} = -97.8$ |  |

References Cited

UNITED STATES PATENTS 2,548,569  4/1951  Tolle _____ 350—216 X

FOREIGN PATENTS 1,145,025  4/1957  France.

DAVID H. RUBIN, *Primary Examiner.*

JOHN K. CORBIN, *Examiner.*